Patented Jan. 17, 1950

2,494,801

UNITED STATES PATENT OFFICE 2,494,801

METHOD FOR PRODUCTION OF 7-CHLORO-4-AMINOQUINOLINES

Willis A. Fisher, Amherst Township, Erie County, N. Y., assignor to the United States of America as represented by the Secretary of War No Drawing. Application June 20, 1947, Serial No. 756,084

3 Claims. (Cl. 260—288)

The present invention relates to an improved process for producing and recovering certain compounds useful as intermediates in the production of improved substances having antimalarial properties.

More specifically, the present invention provides an improved process for separating and recovering the reaction products from the interaction of N,N'-diarylformamidines and malonic esters, which reaction products are convertible readily into valuable intermediate products for the production of antimalarial compounds.

The invention is based on the above indicated reaction, which may be exemplified by the reaction of N,N'-di-(m-chlorophenyl)-formamidine with diethyl malonate, which is represented by the reaction

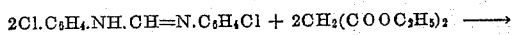
$$\text{I} \qquad\qquad \text{II}$$

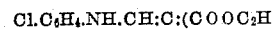 + 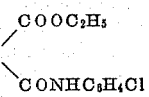 + 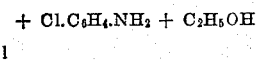

III      IV           V         VI

It is known that employment of elevated temperatures, e. g. 160° C. in this reaction, results in yielding α-carbethoxy-β-(m-chloroanilino)-acrylo-m-chloranilide (compound IV above) to the substantial exclusion of ethyl-α-carbethoxy-β-(m-chloranilino) - arcylate (compound III above), whereas use of substantially lower temperatures not exceeding 125° C. greatly increases the proportion of ethyl-α-carbethoxy-β-(m-chloranilino) acrylate (compound III).

This discovery was of importance, since ethyl-α-carbethoxy-β-(m-chloranilino)-acrylate (compound III above) can be cyclized readily to a mixture of ethyl-5-chloro-4-hydroxyquinoline-3-carboxylate and ethyl-7-chloro-4-hydroxyquinoline-3-carboxylate, with the latter predominating and yielding a corresponding acid which is a valuable intermediate for the production of an antimalarial drug of the 7-chloro-4-amino-quinoline type, whereas the anilide (compound IV above) in order to be cyclized to a corresponding mixture of quinoline compounds, must be heated in the presence of such large amounts of inert, high-boiling solvent, for example, diphenyl ether, as to militate against commercial operation.

While formation of the anilide cannot be avoided entirely by operating at reduced temperatures as noted above, nevertheless, the proportion of the anilide (compound IV) to the diester (compound III) obtained thereby is so small that when the mixture of compound IV and compound II is heated in the high-boiling solvent, to effect cyclization of the diester, the anilide, owing to its low concentration in the solvent, is also substantially cyclized to a mixture of 5- and 7-chloro-4-hydroxyquinoline-3-carboxy-m-chloranilides, which yields a corresponding mixture of carboxylic acids on hydrolysis.

It is desirable to remove impurities from the reaction mixture obtained in the foregoing reaction, i. e., unreacted malonic ester (compound II above), N,N' - di - (m - chlorophenyl)-formamidine (compound I), m-chloraniline (compound V) and ethyl alcohol (compound VI), since the presence thereof, especially m-chloraniline, in the cyclization step is harmful to the desired course of the reaction. To remove such impurities, it has been proposed to add to the reaction mass diphenyl ether and an excess of hydrochloric acid so as to form the hydrochloride of N,N'-di-(m-chloranilino) - formamidine which is separable by filtration as an insoluble precipitate, and the hydrochloride of m-chloraniline which is soluble and hence separable in the aqueous phase. However, such a process is disadvantageous in that owing to the presence of both oil and aqueous phases, the filtration of the N,N'-di-(m-chloranilino) formamidine hydrochloride is rendered difficult, and there is a tendency to form emulsions, which prevent satisfactory separation of impurities, especially in large scale operations.

In the improved procedure of the present invention the heretofore-encountered difficulties in such precipitation caused by difficult filtration and tendency to emulsion formation, are obviated, and a satisfactory separation of impurities can be effected easily by the following procedure:

1. Diluting the reaction mass with a water-immiscible organic solvent, for instance, benzene;

2. Adding sufficient hydrochloric acid or hydrobromic acid to convert the m-chloraniline and N,N'-di-(m-chlorophenyl)-formamidine to their hydrochlorides or hydrobromides;

3. Dehydrating the mixture thus obtained by distillation; and

4. Separating the resulting precipitated hydrochlorides or hydrobromides of m-chloraniline and N,N'-di-(m-chlorophenyl)-formamidine from the solution of diester (III) and anilide (IV) in the organic solvent by filtration or equivalent procedure. Preferably, the organic solvent employed boils at low temperatures, for example, benzene, toluene, and the commercial solvent preparation known to the trade as "Skellysolve C," which is a mixture composed predominantly of aliphatic hydrocarbons boiling between 90° C. and 100° C.

Although it was to be expected that the diester would be hydrolyzed substantially with consequent decrease in the yield of the ultimate quinoline compound, by heating it in the presence of aqueous hydrochloric acid or aqueous hydrobromic acid, as in the aforementioned dehydration step, it has been discovered in the development of the present invention that the water can be removed by distillation without substantially adversely affecting the ultimate results. It has been found in carrying out the present improved process that, by dehydrating the reaction mass in the foregoing manner, the hydrochlorides of m-chloraniline and N,N'-di-(m-chlorophenyl)-formamidine are obtained in the form of crystalline particles which are readily separated from the mother liquors by filtration, whereas prior to the dehydration-distillation step, they are present in the form of a slimy precipitate of amorphous particles, which render filtration difficult. Moreover, the filter cake containing the hydrochlorides of m-chloraniline and N,N'-di-(m-chlorophenyl)-formamidine may be utilized directly for producing more N,N'-di-(m-chlorophenyl)-formamidine by mixing it with sufficient m-chloro-formanilide to react with its content of m-chloraniline hydrochloride, and heating to effect the formation of N,N'-di-(m-chlorophenyl)-formamidine. The reuse of the filter cake in this manner, or a satisfactory separation of impurities, cannot be obtained by employing a chemical dehydrating agent, for instance anhydrous sodium sulphate, and the like, since, among other things, these substances contaminate the filter cake of m-chloraniline and formamidine hydrochlorides.

The improved process of the present invention is illustrated by the following specific example, in which example the indicated amounts represent parts by weight.

A mixture of 160 parts (1 mol) of diethyl malonate, 263 parts (0.993 mol) of N,N'-di-(m-chlorophenyl)-formamidine and 105 parts of benzene was heated with agitation at 100–105° C. for sixteen hours. The reaction mass then was diluted with 1470 parts of benzene, and to the diluted mass there were added 136 parts of 20° Bé. hydrochloric acid. The mixture thus obtained was heated to boiling in a still provided with a reflux condenser adapted to separate the water from the benzene collected as a distillate, and to return the benzene thus collected to the still, the mixture being refluxed until no further water appeared in the distillate. This operation required about four hours, the refluxing temperature rising from 73° C. initially to about 81° C. at the end. The dehydrated still contents then were cooled and filtered to separate the precipitated hydrochlorides of m-chloraniline and of N,N'-di-(m-chlorophenyl)-formamidine. The cake was washed with four portions of benzene, each amounting to 176 parts, and dried at 55° C. The dried cake amounted to 194.7 parts, and consisted of a mixture of 146.9 parts (0.896 mol) of m-chloraniline hydrochloride and 47.8 parts (0.159 mol) of N,N'-di-(m-chlorophenyl)-formamidine hydrochloride.

The filtrate and washes obtained above were combined and concentrated by distillation until 1890 parts of benzene had been collected. Then 790 parts of "Dowtherm" reagent (a eutectic mixture of diphenyl ether and 26.5 per cent of diphenyl, melting at 12° C. and boiling at 258° C.) were added to the concentrated mass at about 100° C. The mixture was heated at 245° C. during which benzene and other volatile materials were distilled off. The agitated mass was heated at 245° C. to 250° C. for thirty minutes to complete the cyclization reaction. To saponify the ethyl chloro-4-hydroxy-quinoline-3-carboxylates thus formed, the reaction mass was cooled, mixed with 1050 parts of water and 263 parts of 50 per cent caustic soda liquor, and refluxed for three hours. The resulting mass was allowed to stratify, and the "Dowtherm" layer was separated while the mass was still hot (90° to 95° C.). The aqueous portion was allowed to cool to room temperature and filtered to remove the resulting precipitated chloro-4-hydroxy-quinoline-3-carboxy-m-chloranilide (consisting probably of a mixture of the 5- and 7-chloro-isomers), which was also formed during the cyclization step.

The anilide thus obtained by washing the filter cake with 1000 parts of water and drying, amounted to 14.1 parts (0.0451 mol) and melted at from 314° C. to 322° C. The filtrate and wash were combined, further diluted with 500 parts of water, and rendered neutral to Congo red by adding 184 parts of 66° Bé. sulphuric acid. The resulting precipitate of chlorohydroxyquinoline carboxylic acids was separated as a cake by filtration, and the cake was washed acid-free with water, and dried. The dry product thus obtained amounted to 128.9 parts and melted at from 235° C. to 245° C. It consisted of a mixture of about 80 per cent of 7-chloro-4-hydroxy-quinoline-3-carboxylic acid and about 20 per cent of 5-chloro-4-hydroxyquinoline-3-carboxylic acid.

Similar results were obtained by using toluene or Skellysolve C in place of benzene in the dehydration step of the foregoing example.

The dehydration of the reaction mixture from malonic ester (compound II of the above reaction) and N,N'-di-(m-chlorophenyl)-formamidine (compound I) of the above reaction preferably is effected at temperatures not materially exceeding 125° C., since temperatures much above this limit tend to promote the reaction between m-chloraniline (compound V) and ethyl-2-carbethoxy-β-(m-chloranilino)-acrylate (compound III) to form the undesired anilide (compound IV).

The water-immiscible organic solvent employed to effect the separation of impurities in the present invention must be an inert liquid, which dissolves the α-carboxy-β-arylaminoacrylate ester (illustrated by formula III of the above reaction) and α-carboxy-β-arylamino-acrylo-arylide (illustrated by formula IV in the above reaction), but not the hydrochloride of the N,N'-diaryl formamidine (illustrated by formula I in the above reaction) which is used, nor the hydrochloride of the arylamine (illustrated by formula V in the above reaction) which is formed in the process. A low-boiling organic solvent, such as those illustrated in the example, is advantageously employed since it often functions as an entraining agent and facilitates the complete removal of water at low temperatures and is itself readily removed by distillation.

However, high-boiling solvents may be used, in which case the complete removal of the water from the reaction mass can be achieved readily at low temperatures by working under reduced pressures. In this manner the solvent used for the cyclization step, provided it has the aforementioned solvent properties, for example, diphenyl ether, could be employed from the start in the absence of other solvents.

While the process of the present invention has been illustrated only with the reaction employing malonic ester and N,N'-di-(m-chlorophenyl)-formamidine, the process of the invention is applicable similarly to reaction mixtures obtained from other esters of malonic acid, e. g. dimethyl malonate and other N,N'-diaryl formamidines, e. g. N,N'-diphenyl formamidine, N,N'-di(2-methyl-4-chlorophenyl)-formamidine, and the like. Furthermore in the process of the invention hydrobromic acid may be used in place of hydrochloric acid. From the foregoing, it will be apparent that the specific embodiment of the process of the present invention is illustrative only, and consequently it will be understood that it is intended and desired to embrace within the scope of the invention such modifications and changes as may be necessary to adapt it to varying conditions and uses, as defined in the appended claims.

Having thus described my invention, what I claim as new and wish to secure by Letters Patent is:

1. In a method of producing compounds suitable for conversion into intermediates for the production of compounds having antimalarial properties, which method includes heating to reaction temperatures a mixture of an N,N'-diaryl formamidine and a malonic ester to form an α-carbalkoxy-β-arylamino-acrylate, diluting the resulting reaction mass with a water-immiscible organic solvent, adding sufficient acid of the group consisting of hydrochloric acid and hydrobromic acid to convert unreacted N,N'-diaryl formamidine together with arylamine produced from N,N'-diaryl formamidine to their corresponding hydrohalides, the improvement which comprises dehydrating the resulting mixture by distillation and separating the resulting insoluble hydrohalides of N,N'-diaryl formamidine and the primary arylamine from the solution of the acrylate compound in the organic solvent.

2. In a method of producing compounds suitable for conversion into intermediates for the production of compounds having antimalarial properties, which process includes heating to reactive temperatures a mixture of an N,N'-diaryl formamidine and a malonic ester to form an α-carbalkoxy-β-arylamino-acrylate, diluting the resulting reaction mass with a water-immiscible organic solvent, adding sufficient hydrochloric acid to convert unreacted N,N'-diaryl formamidine together with arylamine produced from N,N'-diaryl formamidine to their hydrochlorides, the improvement which comprises converting the resulting mixture of hydrochlorides into a readily filterable form by dehydrating the mixed hydrochlorides by distillation, separating the resulting insoluble crystalling hydrochlorides from the solution of the acrylic compound in the organic solvent, mixing the resulting separated crystalline hydrochlorides with sufficient formarylide corresponding to the N,N'-diaryl formamidine to react with the arylamine hydrochloride in the said crystalline hydrochlorides, and heating to effect conversion thereof into N,N'-diaryl formamidine.

3. In a method of producing a compound suitable for conversion into an intermediate for production of an antimalarial drug of the 7-chloro-4-aminoquinoline type, which method includes heating a mixture of 1 mol of diethyl malonate, 0.993 mol of N,N'-di-(m-chlorophenyl) formamidine and 105 parts of benzene, at 100° C. to 105° C. for substantially sixteen hours, diluting the resulting reaction mass with substantially 1470 parts of benzene, adding to the diluted mass 136 parts of 20° Bé. hydrochloric acid, the improvement which comprises refluxing the resulting material until the benzene is freed from water, cooling the resulting dehydrated mixture, filtering the mixture to obtain a filter cake composed of the hydrochlorides of m-chloraniline and of N,N'-di-(m-chlorophenyl)-formamidine, and a filtrate, washing the filter cake with benzene, and combining the filtrate and the benzene washings.

WILLIS A. FISHER.

REFERENCES CITED

The following references are of record in the file of this patent:

Gould et al., J. Am. Chem. Soc., vol. 61, p. 2890 (1939).

Price et al., J. Am. Chem. Soc., vol. 68, pp. 1255–1256 (Rec. for Pub. Apr. 5, 1946).